United States Patent Office 3,663,634
Patented May 16, 1972

3,663,634
PREPARATION OF ORGANODILITHIUM INITIATOR AND POLYMERIZATIONS UTILIZING SAME
Maurice Morton and Lewis J. Fetters, Akron, Ohio, assignors to The Goodyear Tire & Rubber Company, Akron, Ohio
No Drawing. Filed Sept. 19, 1969, Ser. No. 859,576
Int. Cl. C07c 11/26
U.S. Cl. 260—665 R          5 Claims

ABSTRACT OF THE DISCLOSURE

A method of preparing hydrocarbon soluble organodilithium polymerization initiators in a one-step process by forming the organodilithium initiators in a solvent system comprising (A) a compound selected from a group consisting of aliphatic, cycloaliphatic and aromatic hydrocarbons and (B) at least one compound selected from a group consisting of aromatic ethers, aromatic thioethers and tertiary amines responding to the formula R'R''R'''N where N is nitrogen and R', R'' and R''' are alkyl, cycloalkyl and alkaryl radicals and where R', R'' and R''' may or may not be the same and where the (B) solvent component can range from at least 10 percent by volume.

This invention relates to a method for preparing polymerization initiators. More specifically, the invention relates to an improved process for the preparation of organodilithium initiators of polyaryl-substituted ethylenes, substituted and unsubstituted conjugated dienes and vinyl substituted aromatic compounds. In another aspect the invention relates to the use of these polylithium initiators in the polymerization of conjugated dienes either alone or in admixture with each other or in admixture with other types of polymerizable monomers such as vinyl substituted aromatic compounds.

In recent years, there has been a great deal of activity in the development of processes for producing homopolymers of conjugated dienes and copolymers and block polymers of conjugated dienes with other polymerizable monomers. It is well known that the reaction products of lithium and polyaryl substituted ethylenes, substituted and unsubstituted conjugated dienes and/or vinyl substituted aromatic compounds are effective initiators for producing the types of polymers as set forth above. Generally, these initiators have been prepared in the presence of polar solvents such as alkyl ethers, for example, diethyl ether, diisopropyl ether and the like or cyclic and methyl ethers such as dimethyl ether, tertrahydrofuran and the like, and the method has been effective so far as forming the initiator was concerned.

However, the presence of these polar solvents have always exerted a disruptive effect on the mode of addition of conjugated dienes resulting in diene polymers and diene polymer segments of block polymers of conjugated dienes and vinyl substituted aromatic compounds having undesirably high amounts of 1,2- or 3,4-content. This has special significance when such polymers are to be employed as low temperature elastomers for the lower the 1,2- or 3.4-content the lower the freeze point of such polymers becomes.

A number of methods have been proposed for minimizing the disruptive effect of these polar solvents upon the final configuration of diene polymers prepared in their presence. One method involves the replacement of a substantial portion of the polar solvent with a hydrocarbon diluent such as aliphatic, cycloaliphatic or aromatic hydrocarbon, e.g. heptane, cycloheptane, benzene, toluene and the like. By such a method, the quantity of polar solvent can be reduced and its effect on subsequent polymerizations minimized. Another similar method involves the replacement of a substantial portion of the polar solvent with a high boiling (200° C. to 700° C.) dispersing medium such as petroleum light oil, petroleum jelly, hydrocarbon waxes and the like, or the complete elimination of the polar solvent by initially preparing the initiator in the high boiling dispersing agent. The disadvantages of these types of processes are (1) two steps are necessary to prepare the initiator and (2) the replacement of one medium with another prior to polymerization leads to increased operating costs.

Another problem which is inherent in a system employing aliphatic, cyclic or methyl ethers as solvent mediums is that the conditions necessary to remove these solvents can often lead to side reactions to some degree between the dilithium initiator already prepared and the aliphatic, cyclic or methyl ether employed. These side reactions can result in mixtures containing monolithium and dilithium initiators and inactive carbanions. The presence of any monolithium species has special significance when A—B—A type block polymers essentially free of other diluents, that is, other polymeric species, are desired. It is known in the art that when monolithium initiators are employed in the formation of A—B—A type block copolymers that unless special preventive measures are taken during the polymerization steps, premature termination of the living polymer chain may occur due to thermal termination or due to precipitation of the polymer itself from the polymerization medium giving rise to a variety of other polymeric species. The greater the quantity of these other polymeric species becomes, the poorer the physical properties of the A—B—A block copolymers are relative to tensile strength, elongation at break, softening point and other characteristics.

The present invention is primarily concerned with an improved process for the preparation of "pure" dilithium initiators of polyaryl substituted ethylenes, substituted and aromatic compounds and to the subsequent use of these dilithium initiators in the polymerization of conjugated dienes, either alone or in admixture with each other or in admixture with the other types of polymerizable monomers such as vinyl substituted aromatic compounds, obviating the disadvantages of the prior art preparation processes. By the term "pure" is meant that one and only one active lithium species is formed, that is, a dilithium species.

Accordingly, one object of this invention is to provide an improved method for preparing organodilithium initiators. Another object of this invention is to provide a novel initiator compositions capable of polymerizing conjugated diene and vinyl substituted aromatic monomers. Another object of this invention is to provide "pure" organodilithium initiators.

A further object of this invention is to provide an improved polymerization process for (1) polymerizing conjugated dienes either alone or in admixture with each other, (2) for polymerizing vinyl substituted aromatic compounds either alone or in admixture with each other and (3) for copolymerizing conjugated dienes and vinyl substituted aromatic compounds with each other to form A—B—A block polymers essentially free of diluents, that is, other polymeric species. Other objects will become apparent to those skilled in the art as the description proceeds.

According to the present invention, a method has been found for preparing hydrocarbon soluble organodilithium initiators which comprises intimately contacting lithium metal with at least one compound selected from a group consisting of polyaryl substituted ethylenes, substituted and unsubstituted conjugated dienes and vinyl substituted aromatic compounds in a mixed solvent system comprised of (A) a compound selected from a group consisting of aliphatic, cycloaliphatic and aromatic hydrocarbons, and (B) at least one compound selected from a group consisting of (1) aromatic and mixed aliphatic-aromatic ethers responding to the formula R—O—R' where O is oxygen and R is alkyl, hydrocarbon substituted alkyl, alkenyl, alkaryl, and unsubstituted and hydrocarbon substituted mono- and polycyclic aromatic radical and R' is alkaryl and unsubstituted and hydrocarbon substituted mono- and polycyclic aromatic radicals; (2) aromatic and mixed aliphatic-aromatic thioethers responding to the formula R—S—R' where S is sulfur and R is alkyl, hydrocarbon substituted alkyl, alkenyl, alkaryl and unsubstituted and hydrocarbon substituted mono- and polycyclic aromatic radicals and R' is alkaryl and unsubstituted and hydrocarbon substituted mono- and polycyclic aromatic radicals and (3) tertiary amines responding to the formula R'R''R'''N where N is nitrogen and R', R'' and R''' are alkyl, aryl and alkaryl radicals and where R', R'' and R''' may or may not be the same and wherein the percent by volume of solvent component (A) in the solvent mixture can range from about 57.0 to about 92.0 percent and wherein the percent by volume of solvent component (B) in the solvent mixture can range from about 8.0 to about 43.0 percent.

The ethers useful as the solvent component (B) above in the preparation of organodilithium initiators include aromatic and mixed aliphatic-aromatic ethers responding to the formula ROR' where O is oxygen, R is alkyl, hydrocarbon substituted alkyl, alkenyl, alkaryl, and unsubstituted and hydrocarbon substituted mono- and polycyclic aromatic radicals and R' is alkaryl and unsubstituted and hydrocarbon substituted mono- and polycyclic aromatic radicals and aromatic and mixed aliphatic-aromatic thioethers responding to the formula RSR' where S is sulfur, R is alkyl, hydrocarbon substituted alkyl, alkenyl, alkaryl, and unsubstituted and hydrocarbon substituted mono- and polycyclic radicals and R' is alkaryl, and unsubstituted and hydrocarbon substituted mono- and polycyclic aromatic radicals. These ethers can be employed alone or in admixture with soluble hydrocarbon diluents. These ethers have been found to have little or no deleterious effect on the 1,4 structure of anionically prepared polydienes. It has also been found that since these ethers need not be removed prior to polymerization of the conjugated diene monomer there is no possibility of side reactions occurring between the dilithium initiator and the ether solvent employed.

Representative examples of the aromatic and mixed aliphatic-aromatic ethers and aromatic and mixed aliphatic-aromatic thioethers include methyl phenyl ether; ethyl phenyl ether; diphenyl ether; dibiphenyl ether; allyl 2-naphthyl ether; allyl phenyl ether; allyl 2-tolyl ether; allyl 3-tolyl ether; allyl 4-tolyl ether; benzyl butyl ether; benzyl 2'-methylbutyl ether; benzyl 3'- methylbutyl ether; benzyl 3'-methyl ether; benzyl isobutyl ether; benzyl methyl ether; benzyl 1-naphthyl ether; benzyl 2-naphthyl ether; butyl 2-tolyl ether; benzyl ether; 1,1'-dinaphthyl ether, 1,2'-dinaphthyl ether, 2,2'-dinaphthyl ether, 2,2'-dimethoxydiphenyl ether, 2,3-dimethoxydiphenyl ether, 3,3'-dimethoxydiphenyl ether, 2-methoxydiphenyl ether, ethenyl phenyl ether, hexadecyl phenyl ether, 1-naphthyl pentyl ether, octyl phenyl ether, phenyl sulfide, methyl phenyl sulfide, ethyl phenyl sulfide, methyl naphthyl sulfide, ethyl naphthyl sulfide, butyl naphthyl sulfide and the like.

The tertiary amines useful as the solvent component (B) above include those amines responding to the formula R'R''R'''N where N is nitrogen and R', R'', and R''' are alkyl, aryl or alkaryl radicals and wherein R', R'', and R''' may or may not be the same. These amines can be employed alone or in admixture with hydrocarbon diluents. Like the above described ethers, these amines have been found to have little or no adverse effect on the 1,4 structure of anionically prepared polydienes and thus, like the above described ethers need not be removed prior to polymerization of the conjugated diene monomer.

Representative examples of these trialkyl and triaryl amines include trimethyl amine, triethyl amine, N-methyldiethyl amine, tributyl amine, tridecyl amine, tripropyl amine, N-benzyl - N - methyl-o-toluidine, dibenzyl ethyl amine, dibenzyl phenyl amine, diphenyl ethyl amine, diphenyl methyl amine, triallyl amine, tribenzyl amine, dimethyl phenyl amine, triphenyl amine, dibenzyl methyl amine, diethyl phenyl amine, dimethyl benzyl amine, methyl ethyl phenyl amine, diethyl benzyl amine, and the like.

As mentioned above, the compounds useful as solvent component (B) can be employed alone or in admixture with either aliphatic, cycloaliphatic or aromatic hydrocarbons such as pentane, hexane, cyclohexane, cyclooctane, benzene, toluene and the like. When solvent component (B) is employed in admixture with a hydrocarbon diluent the percent by volume of solvent component (B) must be at least 8.0 percent. When the volume percent of solvent component (B) is below 8.0 percent the initiator will precipitate from solution when added to the polymerization system, thus, making it necessary to solubilize the organodilithium initiator prior to its addition to the reaction system by reacting it with a conjugated diene or vinyl-substituted aromatic compound to form a low molecular weight oligomeric dilithium initiator which will remain soluble.

The lithium employed in preparing the initiators was in the form of a grease free lithium sand, however, this does not preclude employing lithium in other forms such as chunks, wire, shot and the like. The lithium and the polyaryl-substituted ethylene, substituted and unsubstituted conjugated diene or vinyl-substituted aromatic compound are contacted in the ether medium or ether-hydrocarbon diluent admixture under mild agitation and in either an inert atmosphere such as nitrogen or under vacuum. The time required to form the dilithium initiators can vary over a wide span of time depending upon solvents employed, ratio of reactants, temperature and the like. However, the initiators of the present invention are usually completely formed within 24 to 72 hours. Usually the reaction is carried out at room temperature which can vary from about 20° C. to about 30° C., but both higher and lower temperatures may also be employed.

Representative examples of polyaryl substituted ethylenes useful in the formation of the dilithium initiators include 1,1-diphenylethylene;
1,2-diphenylstilbene;
triphenylethylene;
tetraphenylethylene;
1-phenyl-1-naphthylethylene;
1,2-dinaphthylethylene;
1,1-diphenyl-2-naphthylene and the like.

Representative examples of substituted and unsubstituted conjugated dienes useful in the formation of the dilithium initiator species include 1,3-butadiene;
isoprene;
2,3-dimethyl-1,3-butadiene;
1,3-pentadiene;
2-methyl-3-ethyl-1,3-butadiene;
3-methyl-1,3,pentadiene;
1,3-hexadiene;
1,3-octadiene;
2,3-diethyl-1,3-butadiene and the like.

Representative examples of vinyl-substituted aromatic compounds suitable to form the dilithium initiator include styrene;
alpha methyl styrene;
3-methyl styrene;
3,5-diethylstyrene;
4-phenylstyrene;
4-dodecylstyrene;
3-methyl-5-n-hexylstyrene;
4-cyclohexylstyrene;
3,5-diphenylstyrene;
2,4,6-trimethylstyrene;
2-ethyl-4-benzylstyrene;
2,4,6-tri-tert-butylstyrene and the like.

The organo dilithium initiators may also be prepared by the reaction of lithium with mono- and polycyclic aromatic compounds, including condensed ring aromatics and polyphenyls, polyaryl substituted ethylenes and saturated aliphatic and cycloaliphatic compounds containing 2 halogen atoms per molecule.

Representative examples of the above-described compounds include 1,4-dibromobenzene;
1,4-dichlorobenzene;
4,4'-dichlorodiphenyl;
1,5-dichloronaphthylene;
9,10-dibromoanthracene;
9,10-dichlorophenone-anthracene;
1,2-dichloro-1,2-diphenylethane;
1,4-dichlorobutane;
1,6-diiodohexane;
1,12-dibromo dodecane;
1,4-dichlorocyclohexane, and the like. A representative example of a method for preparing a hydrocarbon soluble organodilithium polymerization initiator in accordance with the present invention includes contacting lithium metal with 1,1-diphenylethylene in a solvent mixture composed of about 15 percent by volume of anisole and about 85 percent by volume of benzene at a temperature in the range of about 0° C. to about 50° C.

It has been found that "pure" dilithium initiators can be prepared employing the teachings of this invention. As mentioned earlier, by the term "pure" is meant that one and only one active lithium species is formed, that is, a dilithium species. The more pure the initiator, the more predictable and the purer the polymerization products resulting from the use of the initiators of this invention. A comparison of the actual molecular weights of the polymers prepared by the initiators of this invention to their predicted molecular weights has shown that the initiator compositions are strictly difunctional. That is, only an organodilithium species is present. The purity of the dilithium initiators is further evidenced by the Gel Permeation Chromatography (GPC) profiles of low molecular weight polymers prepared by these initiators. When the organolithium initiators employed are composed entirely of the organodilithium species the GPC profiles will show only one narrow molecular weight distribution peak. The total absence of any shoulder on the left side of the molecular weight distribution peak is indicative of the fact that no lower molecular weight material has been produced either from monolithium termination reactions or initiation by monolithium species.

As mentioned above, the initiators described in the present invention have particular significance in the polymerization of conjugated dienes and block polymers of conjugated dienes and vinyl substituted aromatic compounds of the A—B—A type in that homopolymers of conjugated dienes and the conjugated diene polymer segment of A—B—A type block polymers of conjugated dienes and vinyl substituted aromatic compounds contain a high 1,4-configuration.

The monomers which are capable of being polymerized in the presence of the organodilithium initiators of the invention are of two classes. One class consists of conjugated dienes containing from 4 to 12 carbon atoms inclusive and the second class consists of vinyl substituted aromatic compounds in which the total number of carbon atoms in the combined constituents is not greater than 20.

The conjugated dienes can be polymerized either alone or in admixture with each other to form homopolymers, copolymers or block polymers. The terminally reactive polymers formed from conjugated diene monomers are preferably liquids having molecular weights ranging from about 1,000 to 20,000 and preferably from about 3,000 to 10,000. However, depending on the amount of initiator used, semisolid and solid terminally reactive polymers having molecular weights up to 150,000 and higher can also be prepared.

These low molecular weight active polymer solutions can be treated with various reagents to introduce reactive end groups. Representative examples of reactive end groups which can be substituted onto the polymer chain ends include SH, OH, COOH, halogen atoms, and the like.

The second class of monomers mentioned above, that is, vinyl substituted aromatic compounds, can also be polymerized either alone or in admixture with each other to form homopolymer, copolymer or block polymers.

Of greater importance is the block polymerization of the two classes of monomers described above to give block polymers of the A—B—A type essentially free from other diluents, that is, other polymeric species, wherein the A segment of the block polymer is a vinyl substituted aromatic polymer and the B segment is a conjugated diene polymer containing a high 1,4-configuration. This type of block polymer is generally prepared by first charging the conjugated diene to the reaction vessel, allowing it to polymerize and then charging the vinyl substituted aromatic compound and allowing it to polymerize on the ends of active difunctional diene polymer. However, block polymers of the A—B—A type can also be prepared in a one-step process. Thus, both the conjugated diene and the vinyl substituted aromatic compound can be charged to the reaction vessel simultaneously with the conjugated diene monomer polymerizing first followed by polymerization of the vinyl substituted aromatic compounds.

Representative examples of conjugated dienes include 1,3-butadiene;
isoprene;
2,3-dimethyl-1,3-butadiene;
1,3-pentadiene;
2-methyl-3-ethyl-1,3-butadiene;
3-methyl-1,3-pentadiene;
1,3-hexadiene;
1,3-octadiene, and the like.

Representative examples of vinyl substituted aromatic compounds include styrene;
alpha-methylstyrene;
3-methylstyrene;
3,5-diethyl styrene;
4-phenylstyrene;
4-dodecylstyrene;
3-methyl-5-n-hexylstyrene;
4-cyclohexylstyrene;
3,5-diphenylstyrene;
2,4,6-trimethylstyrene;
2-ethyl-4-benzylstyrene;
2,4,5-tri-tert-butylstyrene, and the like.

The organodilithium initiators prepared in accordance with the teachings of this invention are most effective for the production of polydienes and block copolymers containing polydiene segments having a high 1,4-structure. The polymerization is carried out in the presence of a hydrocarbon diluent at a temperature ranging from about −100 to about 150° C., more preferably from about −75° C. and most preferably from about 0° C. to about 50° C. The particular temperature employed depends on both the monomer and the initiator used in the polymerization. The amount of initiator employed during the polymerization will vary from about 100 to 0.01 millimoles of lithium per hundred grams of monomer depending upon the types of polymers and molecular weights desired.

In general, the polymerizations of this invention are carried out in any inert solvent and thus are solution polymerizations. By the term "inert solvent" is meant that the solvent or diluent does not enter into the strucure of the resulting polymer, nor does it adversely affect the properties of the resulting polymer, nor does it have any adverse affect on the activity of the catalyst employed. Such solvents are usually aliphatic, cycloaliphatic or aromatic hydrocarbons, representatives of which are pentane, hexane, heptane, benzene, toluene, cyclohexane, and the like.

The practice of this invention is further illustrated by reference to the following examples which are intended to be representative rather than restrictive of the scope of this invention. In these examples the following were employed unless otherwise noted:

The number average molecular weights were determined in the conventional manner and were measured in toluene at 37° C. Hewlett-Packard high speed osmometers (502 and 503) were used with SαS-08 membranes.

High resolution nuclear magnetic resonance (NMR) spectra of the conjugated diene polymers were used to determine the polymer microstructure. The measurements were obtained on a Varian HA–100 instrument. Solutions of the polymers (20 percent weight per volume) were made up in carbon tetrachloride. An internal standard, tetramethyl silane, was employed, all of which is conventional.

For the stress-strain measurements, films were cast from tetrahydrofuran and dried under vacuum for 96 hours at 50° C. in order to remove all the solvent. Solvent casting was used to prepare the test specimen in order to avoid the variables that can occur when molding techniques are used. The test samples were stamped out of bubble-free films using a micro-dumbbell die. A bench mark of 1 cm. was made on the gauge section of each specimen and testing carried out on a bench model Instron Tensile Tester equipped with pneumatic clamps. A cross-head speed of 2.0 inches per minute was employed for all samples.

EXAMPLE I

A series of organodilithium initiators was prepared by contacting lithium metal and 1,1-diphenylethylene in a mixed solvent system composed of cyclohexane and anisole. The amounts of lithium and anisole employed in each of the initiators in the series were 4.5 grams and 20 ml. respectively. All reactions were carried out under vacuum in glass vessels for 24 hours and at 22–23° C. Table I below contains all pertinent data. Concentration of the soluble lithium initiators was determined by titration with 0.1 NHCl and 0.01 NHCl.

TABLE I

| Expt. No. | 1,1-diphenyl-ethylene, ml. | Cyclo-hexane, ml. | Anisole, vol. percent | Dilithium initiator, concentration, mM./l. |
|---|---|---|---|---|
| DI-103 | 2.6 | 90 | 18 | 55.6 |
| DI-104 | 3.5 | 125 | 14 | 40.9 |
| DI-105 | 2.3 | 120 | 14 | 42.6 |
| DI-107 | 2.5 | 102 | 16 | 42.5 |
| DI-109 | 2.6 | 130 | 13 | 24.4 |
| DI-110 | 2.3 | 128 | 14 | 23.1 |
| DI-112 | 2.7 | 115 | 15 | 39.0 |

EXAMPLE II

A series of polymerization reactions was carried out to form α,ω - diepoxyhydroxy-polyisoprene employing purified isoprene and the dilithium initiators prepared in Example I. All polymerizations were run at 25° C. in cyclohexane. The reactions were allowed to continue until cessation of the polymerization of the isoprene. The 4-vinylcyclohexene diepoxide (VXDO) was then added to each reaction vessel and the solution allowed to react for an additional 24 hours. At the end of this time the solutions were hydrolyzed with water with the exception of Experiment Number 1 which was hydrolyzed with 0.5 NHCl. Table II contains all data pertinent to the polymerization of the isoprene monomer. Table IIA contains data pertinent to specific features of the polymers themselves.

Column 1 of Table II sets forth the experimental number, column 2 contains the specific initiator employed in each polymerization, column 3 sets forth the amount of lithium employed in millimoles (mM.), column 4 sets forth the milliliters (ml.) of cyclohexane solvent, column 5 sets forth the milliliters (ml.) of anisole solvent, column 6 sets forth the amount of isoprene employed in grams (gr.) and column 7 sets forth the amounts of 4-vinyl cyclohexene diepoxide (VXDO) employed in milliliters (ml.).

TABLE II

| Expt. No. | Initiator from Example I [1] | Lithium, mM. | Cyclo-hexane, ml. | Anisole, ml. | Isoprene, gr. | VXDO, ml. |
|---|---|---|---|---|---|---|
| 1 | DI-104 | 5.93 | 125 | 20 | 22.0 | 15.5 |
| 2 | DI-105 | 5.95 | 120 | 20 | 17.6 | 16.0 |
| 3 | DI-107 | 5.20 | 122 | 20 | 21.2 | 14.5 |
| 4 | DI-109 | 1.71 | 59 | 11 | 3.4 | 6.2 |
| 5 | DI-109 | 0.49 | 16.9 | 3.1 | 3.7 | 1.7 |
| 6 | DI-110 | 3.42 | 128 | 20 | 6.5 | 16.0 |
| 7 | DI-112 | 5.26 | 115 | 20 | 6.0 | 17.0 |

[1] Designations correspond to those found in Table I of Example I.

Column 1 of Table IIA sets forth the experimental numbers, column 2 sets forth the ratios of the concentration of anisole to the concentration of lithium, column 3 contains the predicted stoichiometric molecular weight ($\overline{M}_s$), column 4 contains the actual number average molecular weight ($\overline{M}_n$) and columns 5 and 6 set forth the 1,4 and 3,4 content respectively of the polymers obtained.

The predicted stoichiometric molecular weight ($\overline{M}_s$) is based on the assumption that each initiator species contains two lithium counter-ions, i.e., $\overline{M}_s$=grams monomer/0.5 [initiator] where [initiator] equals initiator concentration.

TABLE IIA

| Expt. No. | [Anisole]/[Li]×10⁻² | $\overline{M}_s$×10⁻³ | $\overline{M}_n$×10⁻³ | Microstructure 1,4% | Microstructure 3,4% |
|---|---|---|---|---|---|
| 1 | 3.6 | 7.4 | 12.0 | 79 | 21 |
| 3 | 4.3 | 8.1 | 7.5 | 74 | 26 |
| 4 | 5.8 | 4.0 | 4.0 | 76 | 24 |
| 5 | 5.8 | 15.0 | 14.0 | 78 | 22 |
| 6 | 6.2 | 3.8 | [1] ND | 78 | 22 |
| 7 | 4.1 | 2.3 | ND | ND | ND |

[1] ND=Not determined.

EXAMPLE III

Two experiments were carried out similar to Example II above except that α,ω-dihydroxy-polyisoprene was formed rather than the α,ω-diepoxyhydroxy-polyisoprene form above. The reaction conditions were also identical to those in Example II above except that ethylene oxide was added at the cessation of polymerization rather than 4-vinyl-cyclohexene diepoxide. Table III contains all pertinent information. To experiments No. 1 and 2 were added 0.4 and 1.4 grams of ethylene oxide respectively.

Column 1 of Table III below sets forth the experimental number, column 2 contains the specific initiator employed in each polymerization, column 3 sets forth the amount of lithium employed in millimoles (mM.), column 4 sets for the milliliters (ml). of cyclohexane solvent, column 5 sets forth the milliliters (ml.) of anisole solvent, column 6 sets forth the amount of isoprene employed in grams (gr.), column 7 contains the predicted stoichiometric molecular weight ($\overline{M}_s$) and column 8 contains the actual number average molecular weight ($\overline{M}_n$):

yield was quantitative. The actual number average molecular weight ($\overline{M}_n$) was found to be 132,000 grams/mole. The predicted number average molecular weight ($\overline{M}_s$) for this sample was 127,000 grams/mole. The tensile strength of the poly-α-methylstyrene-polyisoprene-poly-α-methylstyrene block polymer was found to be 450–500 kg./cm.$^2$ at 22° C. and at a crosshead speed of two inches

TABLE III

| Expt. No. | Initiator from Example I [1] | Lithium, mM. | Cyclohexane, ml. | Anisole, ml. | Isoprene, gr. | $\overline{M}_s \times 10^{-3}$ | $\overline{M}_n \times 10^{-3}$ |
|---|---|---|---|---|---|---|---|
| 1 | DI-103 | 6.12 | 90 | 20 | 21.2 | 6.9 | 6.8 |
| 2 | DI-109 | 1.44 | 50.6 | 9.4 | 5.8 | 8.0 | [2] ND |

[1] Designations for initiators employed correspond to those found in Table I of Example I.
[2] ND = Not determined.

EXAMPLE IV

A dilithium initiator was prepared by contacting 1.8 grams of 1,1-diphenylethylene with 4.0 grams of lithium metal in a solvent mixture composed of 70 milliliters (ml.) of cyclohexane and 10 ml. of anisole. The reaction was allowed to proceed for 24 hours at 22° C. The solution was then filtered and the lithium content of the initiator determined to be 0.064 millimole per milliliter (mM./ml.) based on acid titration. To increase the solubility of the dilithium species in hydrocarbon solvent it was reacted with a small amount of styrene to yield a low molecular weight ($\overline{M}_n \approx 3000$) polystyryllithium.

EXAMPLE V

A block polymer of the A–B–A type was prepared employing styrene and isoprene as the monomers. The polymerization mixture consisted of 200 ml. of cyclohexane, 14.1 grams of isoprene, 6.9 grams of styrene and 0.392 millimoles (mM.) of the dilithium initiator prepared in Example IV above. The isoprene was polymerized first followed by one addition of styrene. Polymerization temperature was maintained at 35° C. The reaction was terminated, after completion, with methanol and phenyl-beta-naphthylamine added as an antioxidant. The polymer was then coagulated with methanol and vacuum dried at room temperature. The polymer yield was quantitative. The tensile strength of a microdumbbell test specimen of this polymer was found to be 260 kilograms per square centimeter (kg./cm.$^2$). The high strength of this block polymer affords a good indication of its high degree of difunctionality.

EXAMPLE VI

An A—B—A block polymer was prepared employing α-methyl-styrene and isoprene as the monomers in a two-stage process. First, 20 grams of isoprene in 100 ml. of cyclohexane was polymerized at 25° C. using 0.49 millimole (mM.) of the dilithium initiator prepared in Example IV above. When the reaction was complete 50 ml. of the cyclohexane was removed and 300 ml. of tetrahydrofuran (THF) and 10 grams of α-methylstyrene were added. The solution was then placed in a Dry Ice-alcohol bath (−78° C.) and permitted to react for two weeks. This amount of time is excessive since polymerization of the α-methyl-styrene segment will normally be accomplished within twelve hours or less. The polymer per minutes and which again is indicative of its high degree of difunctionality.

EXAMPLE VII

A series of reactions were carried out to demonstrate the variety of organodilithium initiators that can be prepared in the mixed solvent systems of this invention. All reactions were run at about 22° C. for a period of time ranging from 24 to 48 hours. Table VII below gives the data pertinent to each reaction in the series:

TABLE VII

| Expt. No. | Hydrocarbon | Ether | Diene or vinyl compound | Hydrocarbon, ml. | Ether, ml. | Diene or vinyl compound, gms. | Lithium, gms. | Molarity of dilithium species [1] |
|---|---|---|---|---|---|---|---|---|
| 1 | Benzene | Anisole | t-Stilbene | 50 | 10 | 4.0 | 2.0 | 0.145 |
| 2 | do | do | 1,1-diphenylethylene | 50 | 15 | 2.2 | 4.0 | 0.085 |
| 3 | do | Diphenylether | do | 50 | 23 | 3.3 | 4.0 | 0.055 |
| 4 | Cyclohexane | Anisole | do | 70 | 10 | 1.8 | 4.0 | 0.064 |
| 5 | do | do | α-Methylstyrene | 40 | 30 | 2.0 | 3.0 | 0.048 |
| 6 | Cyclohexanebenzene | do | 1,4-diphenylbutadiene | [2] 70 | 10 | 1.4 | 4.0 | 0.032 |
| 7 | Cyclohexane | do | 1,1-diphenylethylene | 75 | 23 | 10.0 | 5.0 | 0.23 |
| 8 | do | 1-methoxy-naphthalene | do | 70 | 15 | 2.0 | 4.5 | 0.10 |
| 9 | Benzene | Diphenylether | 1,3-pentadiene | 70 | 6 | 8.0 | 8.0 | 0.038 |
| 10 | do | Anisole | Cis-stilbene | 50 | 15 | 4.0 | 4.0 | 0.087 |

[1] Molarity of soluble initiator species was determined by titration with HCl.
[2] Represents a 50/50 mixture of the two designated hydrocarbons.

EXAMPLE VIII

A dilithium initiator was prepared by contacting 1–2 grams of 1,1-diphenylethylene with 2.0 grams of lithium metal in a solvent mixture composed of 85 milliliters (ml.) of cyclohexane and 15 ml. of anisole. The reaction was allowed to proceed for 48 hours at 20° C. The solution was then filtered and the lithium content of the initiator determined to be between 0.1 and 0.8 millimoles per milliliter (mM./ml.). To increase the solubility of the dilithium species in hydrocarbon solvents it was reacted with enough isoprene to generate a low molecular weight ($\overline{M}_n \approx 2{,}000$) polyisophenyllithium.

EXAMPLE IX

A series of polymerizations was carried out to form polyisoprene employing the dilithium initiator prepared in Example VIII above. All polymerizations were run at 25° C. in cyclohexane as the solvent. Following completion of the polymerizations, the reactions were terminated with methanol. Phenyl-beta-naphthylamine was added as antioxidant and the polymers coagulated in methanol and dried in a vacuum oven at room temperature. Polymer yields were quantitative.

Table IX below contains representative data. Column 1 sets forth the experiment number, column 2 the predicted stoichiometric molecular weight ($\overline{M}_s$) and column 3 sets forth the actual number average molecular weight ($\overline{M}_n$).

TABLE IX

| Expt. No. [1] | $\overline{M}_s \times 10^{-3}$, gm. mole$^{-1}$ | $\overline{M}_n \times 10^{-3}$, gm. mole$^{-1}$ |
|---|---|---|
| 1 | 108 | 112 |
| 2 | 100 | 103 |
| 3 | 73 | 71 |

[1] The microstructure of these polyisoprene samples were found to be from 85–95% 1,4 structure as determined by high resolution NMR.

EXAMPLE X

An A—B—A block polymer of styrene and isoprene was prepared in a manner similar to Example V above except that the dilithium initiator prepared in Example VII was employed as the catalyst. The isoprene was polymerized first followed by addition of styrene after the supply of isoprene was depleted. The polymerization solvent was cyclohexane. The polymerization was terminated with methanol and phenyl-beta-naphthylamine added as an antioxidant. The polymer was then coagulated in methanol and dried in a vacuum oven at room temperature. The yield was quantitative.

The predicted stoichiometric molecular weight ($\overline{M}_s$) was calculated to be 127,000 grams per mole, while the actual number average molecular weight ($\overline{M}_n$) was found to be 131,000 grams per mole. The weight percent of end blocks was found to be 33 percent.

While certain representative embodiments and details have been shown for the purpose of illustrating the invention, it will be apparent to those skilled in this art that various changes and modifications may be made therein without departing from the spirit or scope of this invention.

What is claimed is:

1. A method of preparing hydrocarbon soluble organodilithium polymerization initiators comprising intimately contacting lithium metal with at least one compound selected from the group consisting of polyaryl-substituted ethylenes, hydrocarbon substituted and unsubstituted conjugated diolefins and vinyl substituted aromatic compounds containing only carbon and hydrogen atoms in a solvent mixture comprising
   (A) at least one solvent member selected from the group consisting of aliphatic, cycloaliphatic and aromatic hydrocarbons and
   (B) at least one solvent member selected from a group consisting of aromatic ethers, aromatic thioethers and the tertiary amines responding to the formula R'R''R'''N where N is nitrogen and R', R'', and R''' are alkyl, cycloalkyl and alkaryl radicals and where R', R'', and R''' may or may not be the same and wherein the percent by volume of solvent component (A) in the solvent mixture can range from about 57.0 to about 92.0 percent and wherein the percent by volume of solvent component (B) in the solvent mixture can range from 8.0 to about 4.0 percent.

2. A method according to claim 1 wherein solvent component (B) is an aromatic ether.

3. A method according to claim 1 wherein solvent component (B) is anisole.

4. A method according to claim 1 wherein the polyaryl-substituted ethylene is 1,1-diphenylethylene.

5. A method according to claim 1 for preparing a hydrocarbon soluble organodilithium polymerization initiator which comprises contacting (a) lithium metal with (b) 1,1-diphenylethylene in (c) a solvent mixture composed of about 15 percent by volume anisole and about 85 percent by volume of benzene at a temperature in the range of about 0° C. to about 50° C.

References Cited

UNITED STATES PATENTS

| | | | |
|---|---|---|---|
| 2,119,493 | 5/1938 | Scott | 260—168 |
| 3,212,875 | 10/1965 | Strobel | 75—1.5 |

TOBIAS E. LEVOW, Primary Examiner

A. P. DEMERS, Assistant Examiner

U.S. Cl. X.R.

252—431 R; 260—83.7, 84.7, 94.2 R, 94.2 M, 94.6

PO-1050
(5/69)

UNITED STATES PATENT OFFICE
CERTIFICATE OF CORRECTION

Patent No. 3,663,634          Dated May 16, 1972

Inventor(s) Maurice Morton and Lewis J. Fetters

It is certified that error appears in the above-identified patent and that said Letters Patent are hereby corrected as shown below:

Column 8, in Table IIA, the third column heading appears as " $\overline{M}_5 \times 10^{-3}$ " and should be corrected as follows: -- $\overline{M}_s \times 10^{-3}$ --.

Column 12, line 10 of Claim 1, "4.0 percent" should be -- 43.0 percent --.

Signed and sealed this 6th day of March 1973.

(SEAL)
Attest:

EDWARD M. FLETCHER, JR.
Attesting Officer

ROBERT GOTTSCHALK
Commissioner of Patents